US008208153B2

(12) United States Patent
Minami et al.

(10) Patent No.: US 8,208,153 B2
(45) Date of Patent: Jun. 26, 2012

(54) IMAGE PROCESSING APPARATUS, FUNCTION OFFERING METHOD AND COMPUTER PROGRAM PRODUCT

(75) Inventors: Takeshi Minami, Amagasaki (JP); Yoshiyuki Tamai, Itami (JP); Kazumi Sawayanagi, Itami (JP); Hidetaka Iwai, Itami (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1420 days.

(21) Appl. No.: 11/580,887

(22) Filed: Oct. 16, 2006

(65) Prior Publication Data
US 2007/0247661 A1 Oct. 25, 2007

(30) Foreign Application Priority Data

Apr. 21, 2006 (JP) .................................. 2006-117765

(51) Int. Cl.
*G06F 3/12* (2006.01)
(52) U.S. Cl. ..................... 358/1.15; 358/1.13; 358/1.14; 379/93.03; 455/433; 709/201; 710/104
(58) Field of Classification Search .................. 358/1.15; 379/93.03; 709/201, 223, 225, 227, 232; 718/1
See application file for complete search history.

(56) References Cited

U.S. PATENT DOCUMENTS

| 6,330,611 | B1 | 12/2001 | Itoh et al. |
| 6,609,162 | B1* | 8/2003 | Shimizu et al. ................. 710/15 |
| 6,839,755 | B1* | 1/2005 | Kumpf et al. ................. 709/225 |
| 6,965,958 | B1 | 11/2005 | Sugiyama |
| 7,108,436 | B2 | 9/2006 | Sawano |
| 2003/0074386 | A1* | 4/2003 | Schmidt et al. .................. 709/1 |
| 2003/0217095 | A1* | 11/2003 | Kitada et al. .................. 709/201 |
| 2004/0098419 | A1* | 5/2004 | Bantz et al. .................. 707/203 |
| 2004/0267904 | A1 | 12/2004 | Kisono |
| 2005/0027825 | A1* | 2/2005 | Hikawa et al. ................. 709/219 |
| 2005/0088681 | A1* | 4/2005 | Hosoda ......................... 358/1.14 |
| 2006/0069725 | A1* | 3/2006 | Yokokura ..................... 709/203 |

(Continued)

FOREIGN PATENT DOCUMENTS

JP 2000-231471 A 8/2000

(Continued)

OTHER PUBLICATIONS

Japanese Office Action dated Aug. 7, 2007 (with English language translation).

*Primary Examiner* — King Poon
*Assistant Examiner* — David S Cammack
(74) *Attorney, Agent, or Firm* — Buchanan Ingersoll & Rooney PC

(57) ABSTRACT

An image forming apparatus includes a user set data storage portion for storing user set data indicating contents of processing that a user lets the image forming apparatus perform, the user using the image forming apparatus primarily, a new apparatus detection portion for detecting a new image forming apparatus that has newly joined an intranet, a new apparatus function data obtaining portion for obtaining function data indicating functions that the new image forming apparatus has, a suitable function extraction portion for determining, based on the user set data, a function that is more appropriate for the user than a current function from the functions indicated in the function data, and a change candidate notice processing portion for informing the user of the function determined to be more appropriate than the current function.

15 Claims, 15 Drawing Sheets

U.S. PATENT DOCUMENTS

2006/0112172 A1 * 5/2006 Isaac et al. .................... 709/218

FOREIGN PATENT DOCUMENTS

| | | | |
|---|---|---|---|
| JP | 2003-189035 A | 7/2003 | |
| JP | 2003-280851 A | 10/2003 | |
| JP | 2004-127310 A | 4/2004 | |
| JP | 2004127310 A * | 4/2004 | |
| JP | 2004-192321 A | 7/2004 | |
| JP | 2004-318644 A | 11/2004 | |
| JP | 2004-328276 A | 11/2004 | |
| JP | 2004-362458 A | 12/2004 | |
| JP | 2005-011054 A | 1/2005 | |
| JP | 2005-197935 A | 7/2005 | |
| JP | 2006-079353 A | 3/2006 | |

* cited by examiner

FIG. 4

| USER ID | ADDRESS BOOK DATA |
|---|---|
| XA123 | ~6A |
| XB456 | ~6A |
| ⋮ | ⋮ |

FIG. 5

| USER ID | USER SET DATA |
|---|---|
| XA123 | 6Bp 6Bt — 6B |
| XB456 | 6Bp 6Bt — 6B |
| ⋮ | ⋮ |

FIG. 6

| SETTING ITEM | SETTING CONTENTS |
|---|---|
| SETTING FOR WINDOW DISPLAYED IMMEDIATELY AFTER LOGGING IN | COPY COMMAND WINDOW |
| SETTING FOR MESSAGE LANGUAGE | JAPANESE |
| SETTING FOR FONT SIZE WITHIN WINDOW | 14 PT |
| ⋮ | ⋮ |

6Bp

6Bt

| SETTING ITEM | SETTING PROCESSING CONTENTS |
|---|---|
| IFAX RECEPTION SETTING | IFAX RECEPTION IS RECEIVED FROM AN EXTERNAL MAIL SERVER |
| SPECIFIC SENDER DATA TRANSFER SETTING | TRANSFER AN INCOMING DOCUMENT FROM MR. AAA TO 06-XXXX-XXXX BY G3FAX |
| FAX INCOMING DOCUMENT TRANSFER SETTING | FAX INCOMING DOCUMENT IS CONVERTED INTO TEXT DATA TO SEND TO XXXXX@MAIL.····.COM BY ELECTRONIC MAIL |
| ⋮ | ⋮ |

| | IMAGE FORMING APPARATUS 11 8A1(8A) | IMAGE FORMING APPARATUS 12 8A2(8A) | IMAGE FORMING APPARATUS 13 8A3(8A) | IMAGE FORMING APPARATUS 14 8A4(8A) |
|---|---|---|---|---|
| ELECTRONIC MAIL SERVER FUNCTION | NO | NO | NO | YES |
| G3 FAX FUNCTION | YES | NO | YES | YES |
| STAPLING FUNCTION | YES | NO | NO | YES |
| OCR FUNCTION | STANDARD PRECISION VERSION | NO | NO | HIGH PRECISION VERSION |
| BULK DATA SAVING FUNCTION (HARD DISK DRIVE CAPACITY) | 100GB | 100GB | 100GB | 500GB |
| PDF DATA CREATION FUNCTION | STANDARD PDF | NO | NO | COMPACT PDF |
| ELECTRONIC MAIL ENCRYPTION FUNCTION | NO | NO | NO | YES |
| SIP-FAX FUNCTION | NO | NO | NO | YES |
| ... | ... | ... | ... | ... |

FIG. 8

| | 8B1 (8B) | 8B2 (8B) | 8B3 (8B) | 8B4 (8B) | |
| --- | --- | --- | --- | --- | --- |
| | IMAGE FORMING APPARATUS 11 | IMAGE FORMING APPARATUS 12 | IMAGE FORMING APPARATUS 13 | IMAGE FORMING APPARATUS 14 | |
| DEVICE NAME | MFP1 | MFP2 | MFP3 | MFP4 | |
| IP ADDRESS | 192.168.1.101 | 192.168.1.102 | 192.168.1.103 | 192.168.1.104 | |
| MAC ADDRESS | xx.xx.xx.xx.xx.01 | xx.xx.xx.xx.xx.02 | xx.xx.xx.xx.xx.03 | xx.xx.xx.xx.xx.04 | |
| FAX NO. | 072-123-xxxx | - | - | 072-135-xxxx | |
| INSTALLATION LOCATION | ADMINISTRATION BLDG., 2F BUSINESS DEPARTMENT, WEST SIDE | ADMINISTRATION BLDG., 3F SALES DEPARTMENT | ADMINISTRATION BLDG., 3F DEVELOPMENT DEPARTMENT | ADMINISTRATION BLDG., 2F BUSINESS DEPARTMENT, EAST | |
| ... | ... | ... | ... | ... | |

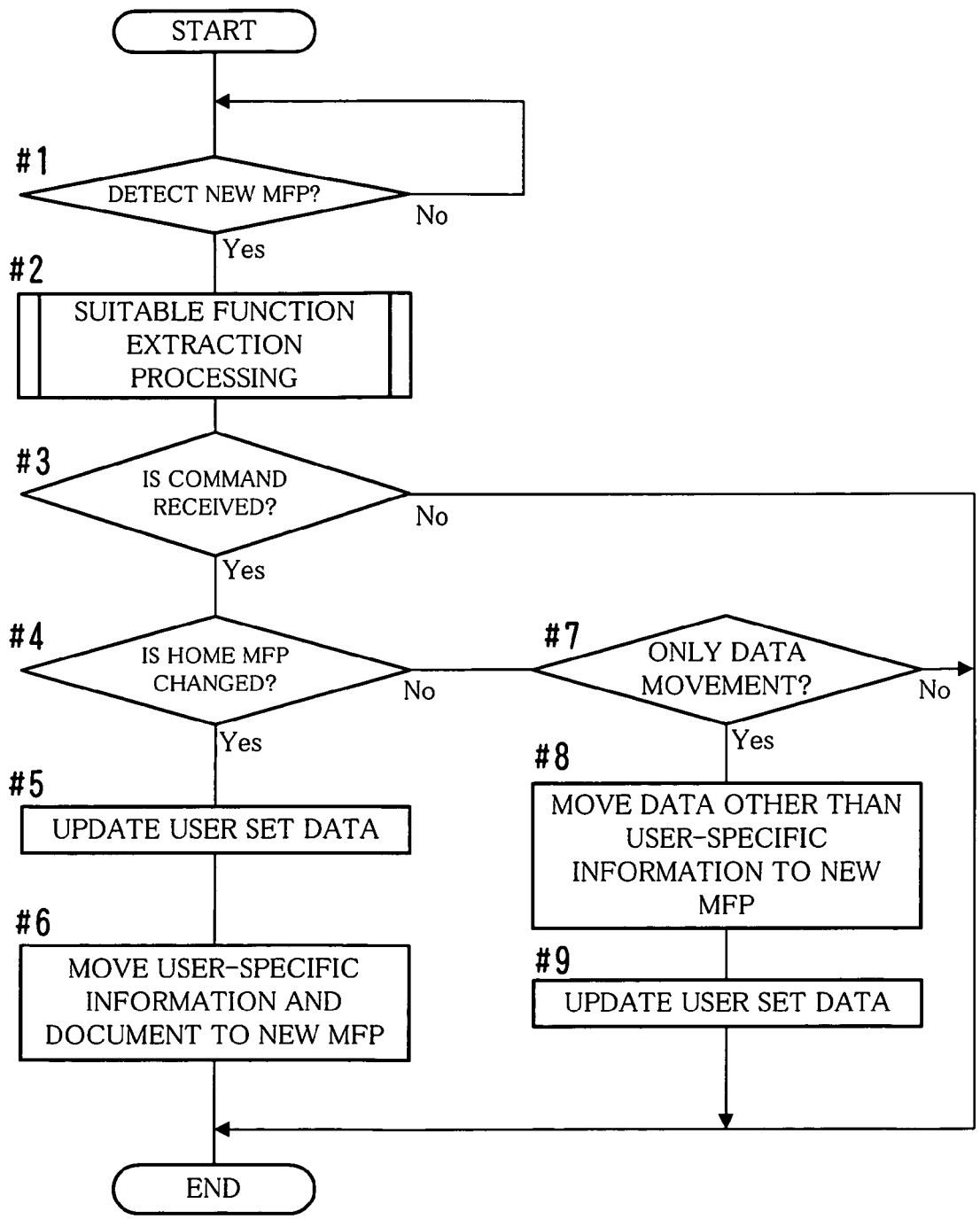

IMAGE PROCESSING APPARATUS, FUNCTION OFFERING METHOD AND COMPUTER PROGRAM PRODUCT

This application is based on Japanese patent application No. 2006-117765 filed on Apr. 21, 2006, the contents of which are hereby incorporated by reference.

BACKGROUND OF THE INVENTION

1. Field of the Invention

The present invention relates to an image processing apparatus such as an MFP used in a network of a government or corporate office.

2. Description of the Related Art

Intranets have recently come into widespread use in government and corporate offices, and others. In addition, image processing apparatuses called Multi Function Peripherals (MFPs) are provided with a network function, so that the image processing apparatuses are used in the intranets together with other devices such as personal computers.

In some cases, an intranet includes a plurality of image processing apparatuses. In such cases, normally, a user of the intranet uses any one of the image processing apparatuses primarily. The user registers his/her private address book, setting information for a touch panel display and others in the image processing apparatus that is used primarily.

Further, a case may arise where a new image processing apparatus that has higher performance than the existing image processing apparatuses is added to an intranet. Depending on the circumstances, it may be convenient for users to use the new image processing apparatus primarily instead of the existing image processing apparatus. Conversely, it may be convenient for the users to use the existing image processing apparatus primarily as before.

There are proposed processing methods relating to an apparatus that is newly added to a network as described in Japanese unexamined patent publication Nos. 2004-127310, 2004-192321, 2004-328276, 2005-11054, 2003-280851 and 2000-231471.

A method described in Japanese unexamined patent publication No. 2004-127310 is used in a network system including a client printer and a server device interconnected via a communications line. The client printer performs inquiry about capability information to other device on the network, and discloses, to a PC, virtual device information created by improving a function as compared with its original capability based on the capability information obtained from the other device. The PC transmits printing data to the client printer based on the virtual device information, and executes a print request. The client printer that has received the print request exceeding its original capability determines a server device for which the processing is asked based on the capability information. Then, the client printer asks the server device for the processing and receives the printing data after the processing to execute print output.

A method described in Japanese unexamined patent publication No. 2004-192321 is used in a printing system that includes a plurality of printers interconnected through a communications line and designates one of the printers to perform printing. At least one of the printers is a high performance printer having high image processing capacity and at least one of the printers is a normal printer having only normal image processing capacity. As to an image processing function, when the processing capacity of the high performance printer is a predetermined multiple or more of that of the normal printer, the image processing function is not performed by the normal printer but is performed by the high performance printer as a proxy. After that, the processing result is transferred to the normal printer and printed out by the normal printer that is designated to perform printing.

Japanese unexamined patent publication No. 2004-328276 describes an image processing system in which a plurality of image forming apparatuses such as digital multifunction devices having different functions and a printer and a server are connected through a network so that they can communicate with one another. According to a method described in the publication, a function discrimination part in the digital multifunction device determines whether the device itself has a desired function or not in response to user's input of the desired function from an input picture only for users in a touch panel part. When it is determined that the device does not have this function, a function retrieval part refers to apparatus information registered in a server to retrieve an image forming apparatus having the function among the plurality of image forming apparatuses on the network, and a display control part displays, on the touch panel part, a message for informing the user of the location of the image forming apparatus retrieved by the function retrieval part.

According to a method described in Japanese unexamined patent publication No. 2005-11054, when detecting that a printer is connected to a local port on a PC which can be connected to a plurality pieces of device equipment including a printing device, a supervisory control program to be executed by a CPU decides whether or not a device driver of the printer whose connection is detected has been installed. When deciding that the device driver has been installed, the supervisory control program sets the printer whose connection has been detected as "a printer to be usually used".

According to a method described in Japanese unexamined patent publication No. 2003-280851, a network printer system is configured as follows: The network printer system is constituted of a printer registering part for registering a printer on a personal computer, a sub-net detecting part for obtaining a sub-net from an IP address and a sub-net mask, a table control part for registering the printer registered by the printer registering part and the sub-net obtained by the sub-net detecting part, and for retrieving the printer from the sub-net, a table for storing the sub-net and the printer by the table control part, a notifying part for notifying whether or not any printer available on the sub-net is present, a printer changing part for changing the printer to be normally used by an OS, a print control part for executing print processing in response to a request from a user, and for notifying the start of print, and a start detecting part for notifying that the personal computer is started.

According to a method described in Japanese unexamined patent publication No. 2000-231471, an external storage device of a computer is provided with a name of a usually-used printer, a name of a printer used last time, a counter for storing continuous printing frequencies of the printer used last time, and a table for storing specified use frequencies. The name of the printer used last time is set to be the name of the usually-used printer when the value of the counter becomes equal to or higher than the value of the specified use frequencies.

Thus, according to the conventional methods, when a new image processing apparatus participates in a network, the existing image processing apparatus can detect a function that is included in the new image processing apparatus and is higher than ever before.

As described earlier, however, it may be convenient for users to primarily use a new image processing apparatus having a function higher than the current function in the future. Conversely, it may be convenient for the users to continue using the existing image processing apparatus primarily. The conventional methods, however, cannot allow for such convenience for the users.

SUMMARY OF THE INVENTION

The present invention is directed to solve the problems pointed out above, and therefore, the present invention may provide a function of a new image processing apparatus in a manner advantageous to users when the new image processing apparatus participates in a network.

An image processing apparatus according to one aspect of the present invention is an image processing apparatus having a portion for joining a network. The apparatus includes a processing contents data storage portion for storing processing contents data indicating contents of processing that a user lets the image processing apparatus perform, the user using the image processing apparatus primarily, a newly-joined apparatus detection portion for detecting a newly-joined image processing apparatus that is other image processing apparatus having newly joined the network, a function data obtaining processing portion for obtaining function data indicating functions that the newly-joined image processing apparatus has, an appropriate function determination portion for determining, based on the processing contents data, a function that is more appropriate for the user than a current function from the functions indicated in the function data, and an appropriate function offering portion for performing processing for presenting, to the user, the function that is determined to be more appropriate than the current function by the appropriate function determination portion.

Preferably, the image processing apparatus further includes a primary apparatus change processing portion for performing primary apparatus change processing by moving data of the user to the newly-joined image processing apparatus when the user states that the user primarily uses the newly-joined image forming apparatus hereafter.

Further, the image processing apparatus further includes a document data saving portion for saving document data of the user, and a data movement processing portion for moving the document data, saved in the document data saving portion, of the user to the newly-joined image processing apparatus when the user states that the user lets the newly-joined image processing apparatus perform processing relating to the function determined to be more appropriate for the user than the current function by the appropriate function determination portion, although the user continues using the image processing apparatus primarily.

The present invention makes it possible to present a function of a new image processing apparatus in a manner beneficial to users when the new image processing apparatus participates in a network.

These and other characteristics and objects of the present invention will become more apparent by the following descriptions of preferred embodiments with reference to drawings.

BRIEF DESCRIPTION OF THE DRAWINGS

FIG. 4 is a diagram showing an example of a method for storing address book data.

FIG. 5 is a diagram showing an example of a structure of user set data and of a method for storing the same.

FIG. 6 is a diagram showing an example of contents of the user set data.

FIG. 7 is a diagram showing an example of function data.

FIG. 8 is a diagram showing an example of apparatus identification data.

FIG. 15 is a flowchart showing a flow example of the entire processing of the image forming apparatus.

DESCRIPTION OF THE PREFERRED EMBODIMENTS

Figure 1:
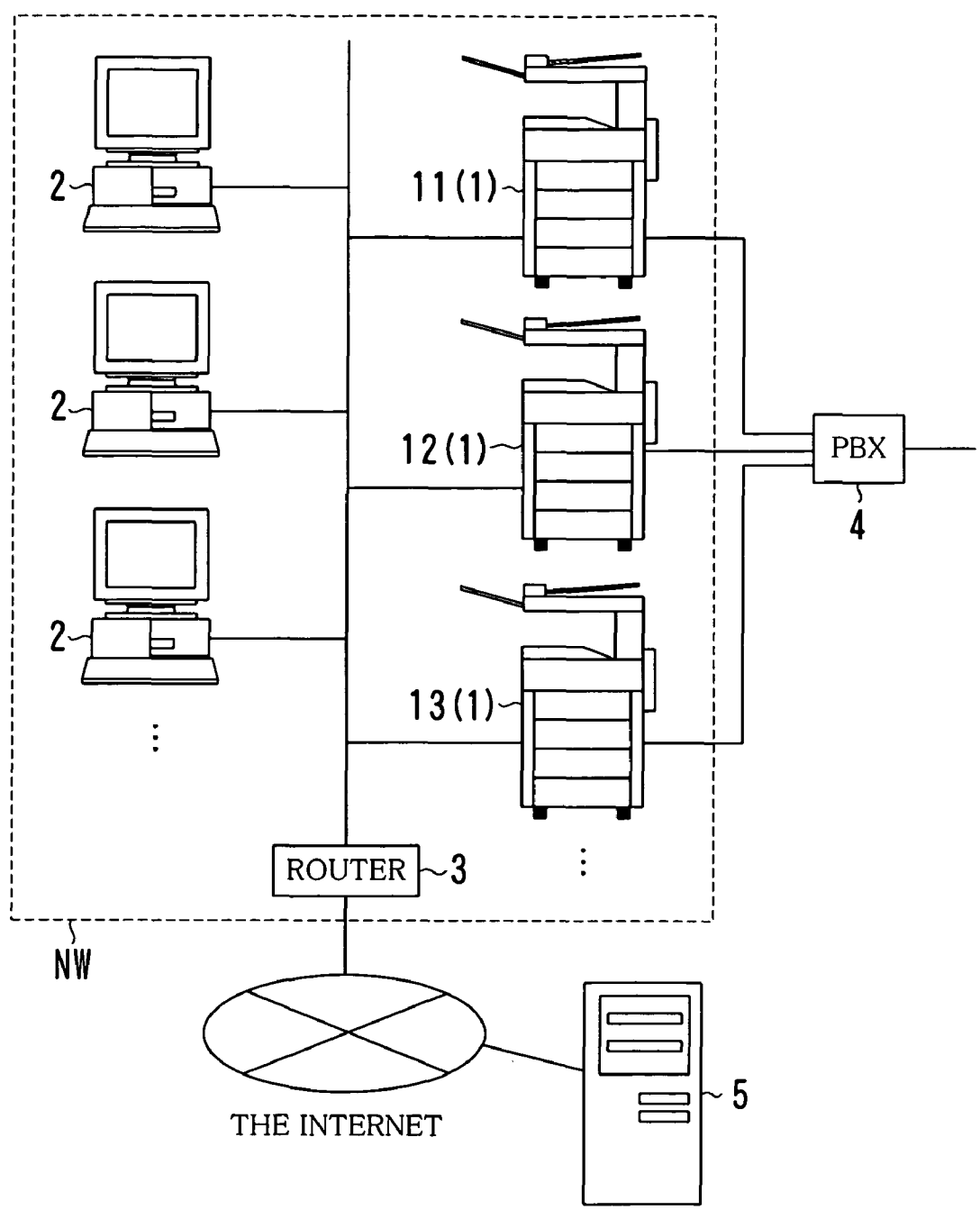
FIG. 1 is a diagram showing an example of the overall configuration of an intranet.
Figure 2:
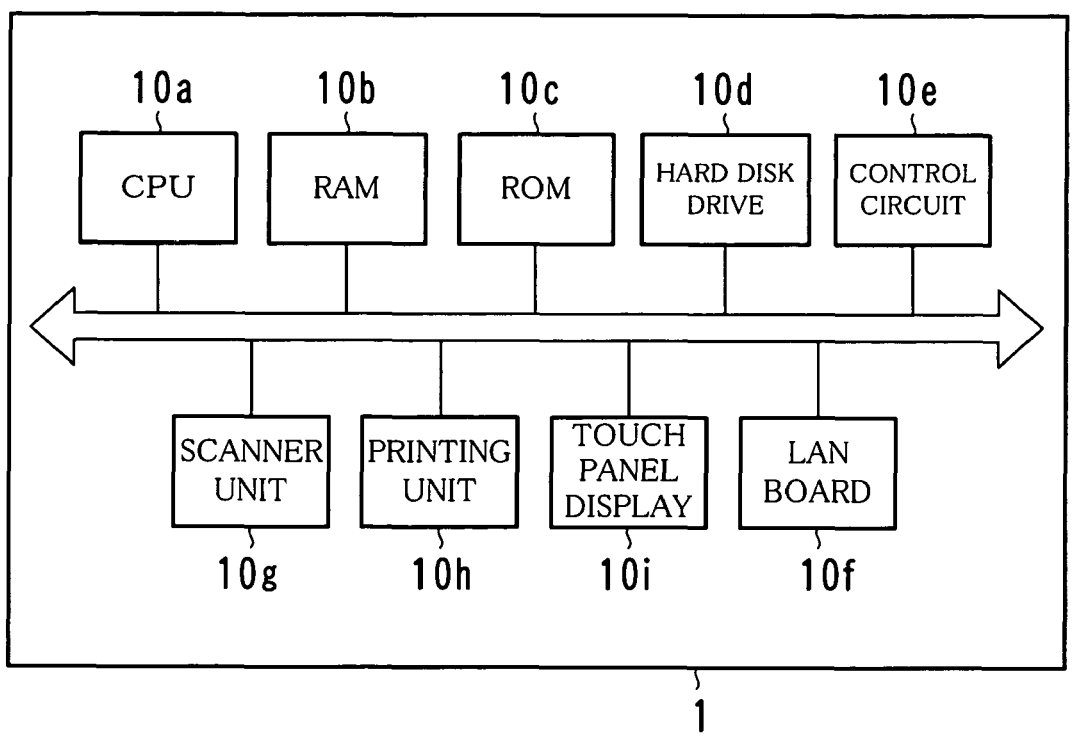
FIG. 2 is a diagram showing an example of a hardware configuration of an image forming apparatus.
Figure 3:
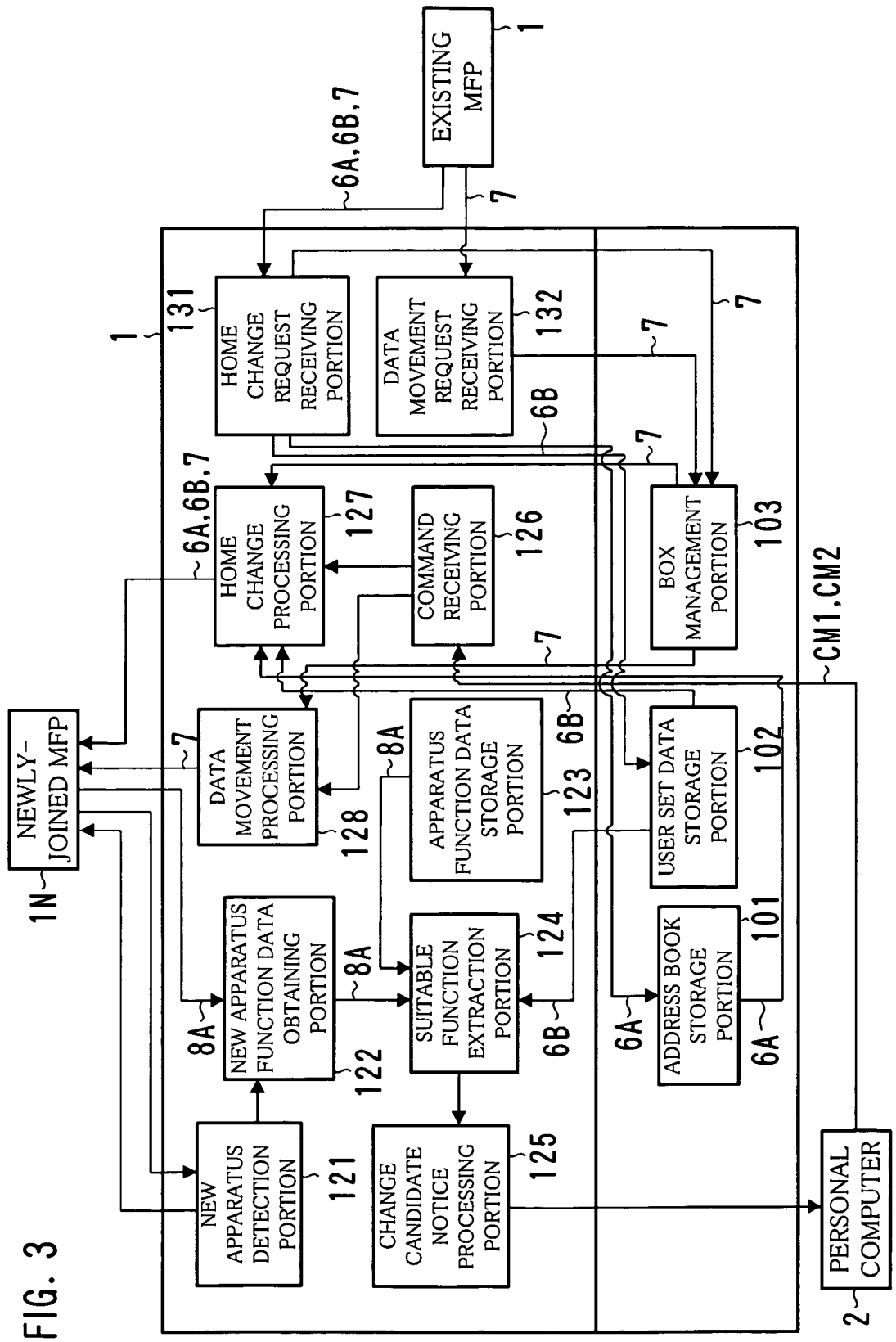
FIG. 3 is a diagram showing an example of a functional configuration of the image forming apparatus.

Referring to FIGS. 1, 2 and 3, an example of the overall configuration of an intranet NW, an example of a hardware configuration of an image forming apparatus 1 and an example of a functional configuration of the image forming apparatus 1 will be described.

Referring to FIG. 1, the intranet NW includes a plurality of the image forming apparatuses 1, a plurality of personal computers 2 and a router 3. The intranet NW is established in an organization such as a government office, a company or a school. These apparatuses/machines can be interconnected via a LAN cable or a wireless line. The following is a description of a case of the intranet NW established in a certain company X. Suppose that each employee of the company X is given a unique user ID.

The image forming apparatus 1 is an image processing apparatus according to the present invention. The image forming apparatus 1 is a processing apparatus in which various functions such as a copy function, a scanner function, a network printing function and a document server function are integrated. In general, the image forming apparatuses 1 are sometimes called Multi Function Peripherals (MFPs), for example.

The "network printing" function is a function to print an image on paper by receiving image data from a personal computer via a communications line. This function is sometimes called a "network printer function" or a "PC print function", for example.

The "document server" function is a function to provide each user with a storage area called, for example, a "box" or a "personal box" corresponding to a folder or directory in a personal computer, thereby enabling the user to store document data such as an image file in user's own storage area. This function is sometimes called a "box function".

Each of the image forming apparatuses 1 is provided with various functions other than the functions mentioned above. The functions provided in each of the image forming apparatuses 1 will be described later.

Hereinafter, each of the image forming apparatuses 1 making up the intranet NW is sometimes referred to as an "image forming apparatus 11", an "image forming apparatus 12", an "image forming apparatus 13" . . . in order to distinguish the image forming apparatuses 1 from one another.

Each user of the intranet NW, i.e., each employee of the company X is required to determine, in advance, any one of the image forming apparatuses 1 as a home MFP. Herein, the "home MFP" means a primary image forming apparatus (MFP) that is frequently used by a user in normal cases. A home MFP for a user is determined depending on a management location of predetermined data that is owned only by the user, namely, of user-specific predetermined data. In other words, an image forming apparatus 1 managing predetermined data of the user is determined to be a home MFP for the user. In this embodiment, an image forming apparatus 1 managing address book data 6A and user set data 6B of a user shall be determined to be a home MFP for the user. The address book data 6A and the user set data 6B are described later. In addition, for an image forming apparatus 1, user(s) who determines the image forming apparatus 1 to be a home MFP is refereed to as a "home user(s)".

As shown in FIG. 2, the image forming apparatus 1 includes a CPU 10a, a RAM 10b, a ROM 10c, a hard disk drive 10d, a control circuit 10e, a LAN board 10f, a scanner unit 10g, a printing unit 10h and a touch panel display 10i. Besides, each of the image forming apparatuses 1 is provided with various types of hardware.

The control circuit 10e is a circuit for controlling the hard disk drive 10d, the LAN board 10f, the scanner unit 10g, the printing unit 10h and the touch panel display 10i.

The LAN board 10f is a Network Interface Card (NIC) for performing data communications with other image forming apparatus 1 or the personal computers 2 in the intranet NW. Data communications is also possible with devices in external networks such as the Internet via the router 3.

The touch panel display 10i displays a screen for providing a user with messages or instructions, a screen for the user to enter desired types of processing and processing conditions, and a screen indicating results of processing executed in the CPU 10a, for example. In addition, the user can provide commands to the image forming apparatus 1 or specify processing conditions by touching predetermined positions on the touch panel display 10i.

The scanner unit 10g optically reads document images such as text, numerical expressions, symbols, photographs, diagrams or illustrations that are depicted on a sheet of paper, and generates image data.

The printing unit 10h forms an image based on the image data obtained with the scanner unit 10g or image data transmitted from the personal computer 2 or the like, and prints the image on a sheet of paper.

On the ROM 10c or the hard disk drive 10d are stored a program and data for implementing functions of an address book storage portion 101, a user set data storage portion 102 and a box management portion 103, all of which are shown in FIG. 3.

Further, on the ROM 10c or the hard disk drive 10d are stored a program and data for implementing functions of a new apparatus detection portion 121, a new apparatus function data obtaining portion 122, an apparatus function data storage portion 123, a suitable function extraction portion 124, a change candidate notice processing portion 125, a command receiving portion 126, a home change processing portion 127, a data movement processing portion 128, a home change request receiving portion 131 and a data movement request receiving portion 132.

The new apparatus detection portion 121 through the data movement processing portion 128 perform processing for recommending users of the intranet NW to change respective home MFPs or to move data when another image forming apparatus 1 is newly added to the intranet NW. When an image forming apparatus 1 is newly added to the intranet NW, the home change request receiving portion 131 and the data movement request receiving portion 132 included in the newly added image forming apparatus 1 receive a request for change of a home user and a request for data movement from other image forming apparatus 1 and perform predetermined processing. Detailed processing contents of each of the portions shown in FIG. 3 will be described later. In addition, on the ROM 10c and the hard disk drive 10d is stored, for each image forming apparatus 1, a program for various functions.

The program and data are read into the RAM 10b as needed, and the program is executed by the CPU 10a. Alternatively, some or all of the functions shown in FIG. 3 may be implemented with the control circuit 10e.

Referring back to FIG. 1, a driver and an application are installed in the personal computer 2 in order to make the image forming apparatus 1 perform various types of processing. A user can use the personal computer 2 to operate the image forming apparatus 1 remotely.

The router 3 is a device for connecting the intranet NW to an external network such as the Internet.

The office of the company X is provided with a private branch exchange (PBX) 4 for connecting a telephone line in the office, namely, an extension to a public telephone line. The company X has an electronic mail server 5 for the company itself on the Internet.

Figure 9:
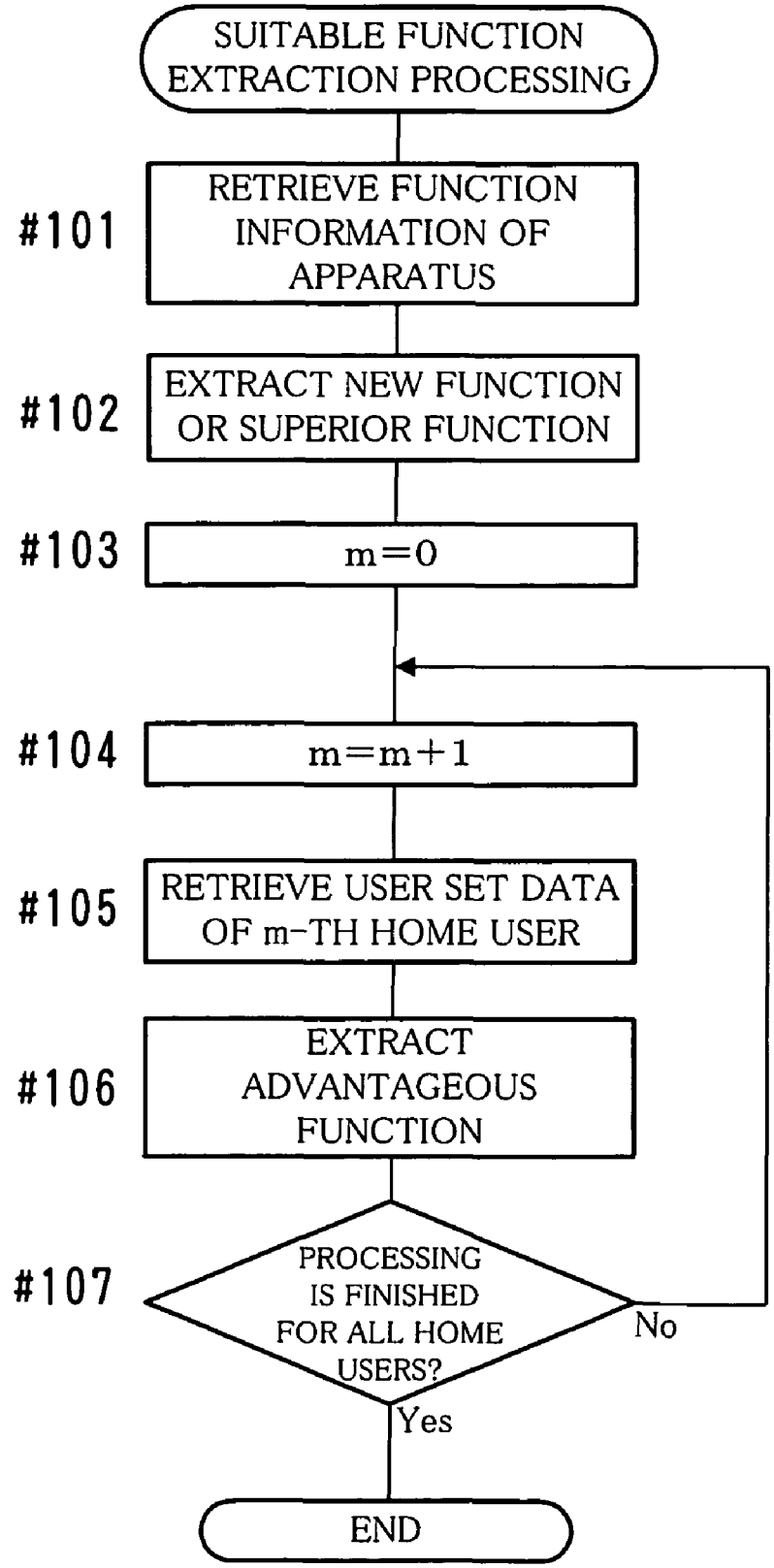
FIG. 9 is a flowchart showing a flow example of suitable function extraction processing.
Figure 10:
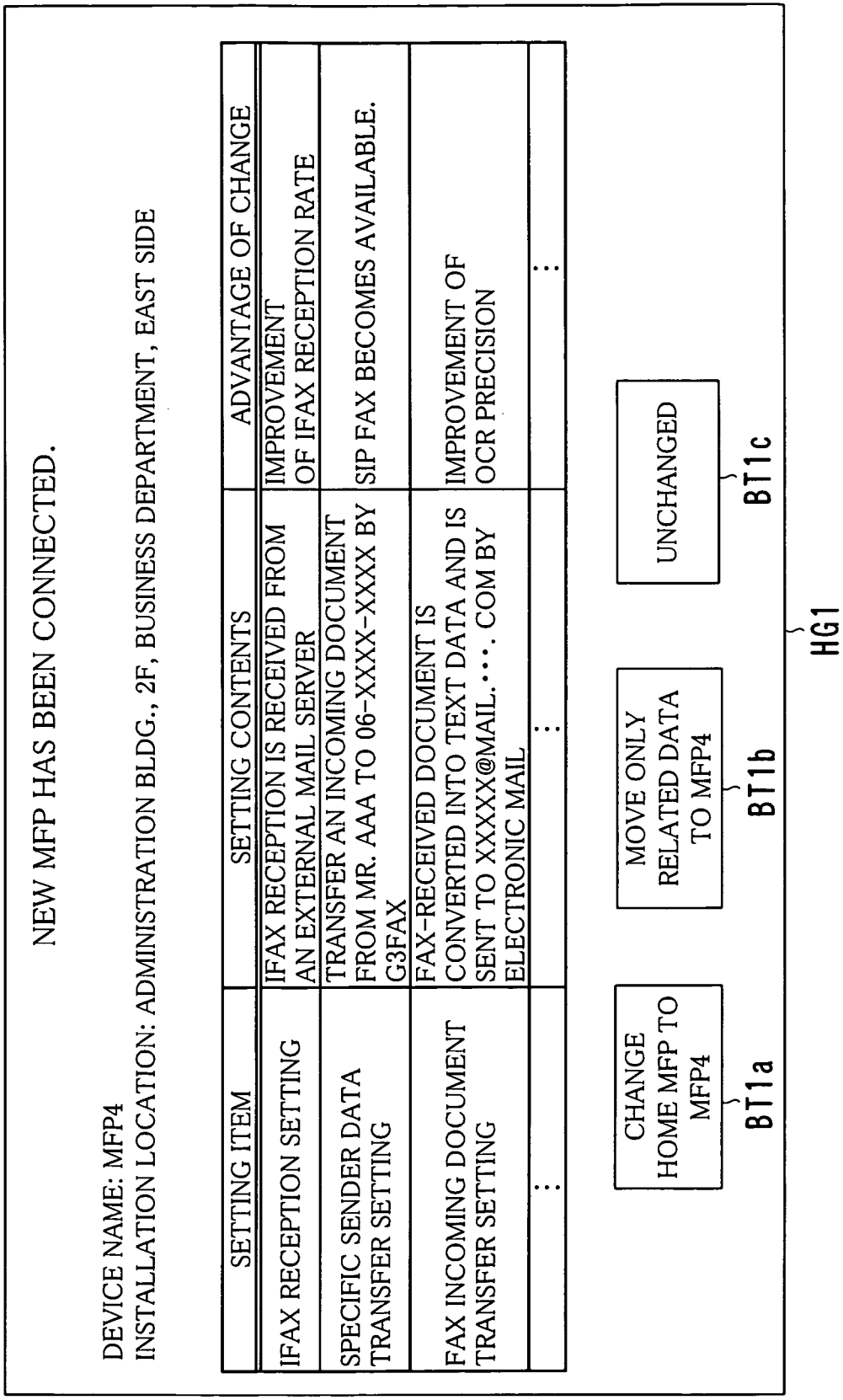
FIG. 10 shows an example of an electronic mail screen.

Referring to FIGS. 4, 5, 6, 7 and 8, an example of a method for storing the address book data 6A, an example of a structure of the user set data 6B and of a method for storing the same, an example of contents of the user set data 6B, an example of function data 8A and an example of apparatus identification data 8B will be described. FIG. 9 is a flowchart showing a flow example of suitable function extraction processing and FIG. 10 shows an example of an electronic mail screen HG1.

Figure 4:
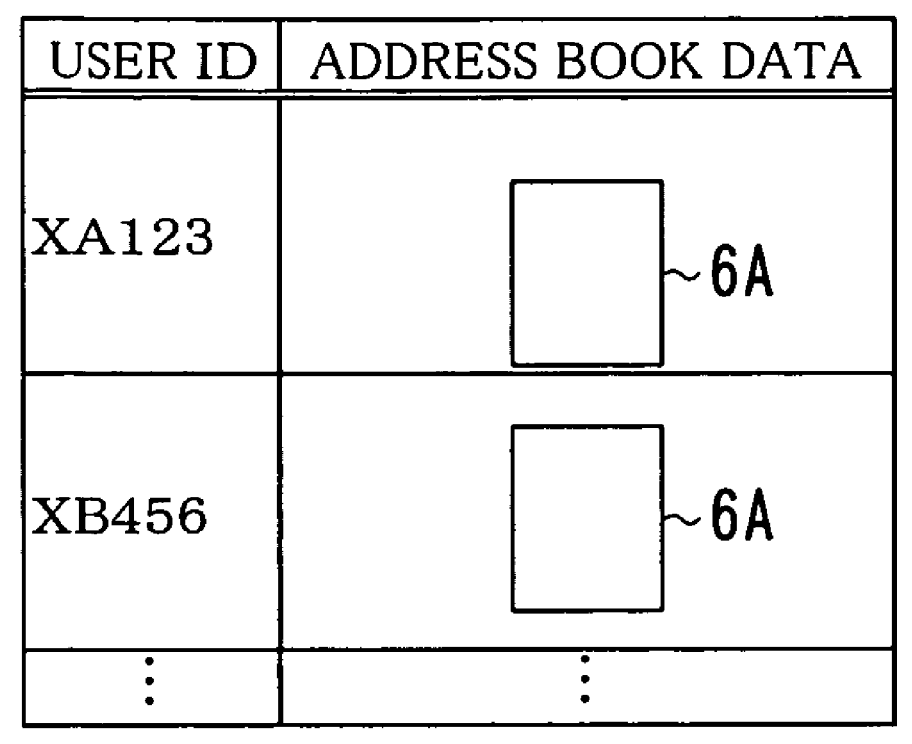

Next, a detailed description is provided of processing contents of each of the portions included in the image forming apparatus 1 shown in FIG. 3. The address book storage portion 101 stores address book data 6A that is data of a personal address book of a user who registers that image forming apparatus 1 as a home MFP, i.e., a home user for that image forming apparatus 1. As shown in FIG. 4, the address data 6A is associated with a user ID of a user who owns the address data 6A.

Figure 5:
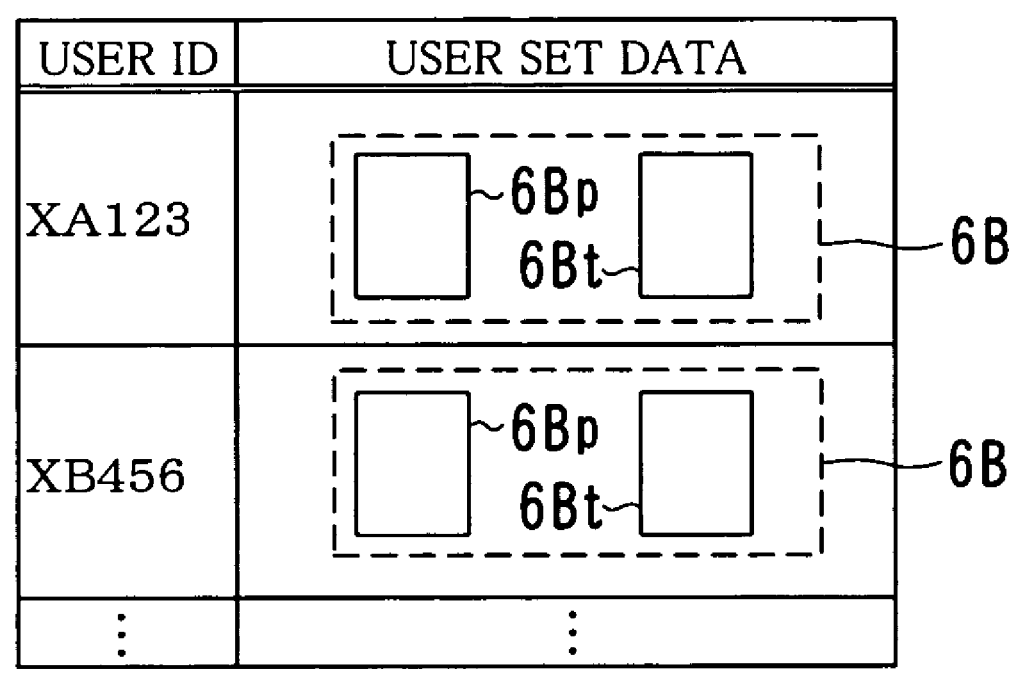

Referring to FIG. 5, the user set data storage portion 102 stores user set data 6B in association with a user ID for each home user for that image forming apparatus 1. The user set data 6B is so-called user profile data. The user set data 6B indicates information on usage pattern of that image forming apparatus 1. The usage pattern is set by each home user in accordance with his/her preference, object and often-used processing.

More specifically, the user set data 6B includes panel set data 6Bp and set processing contents data 6Bt as shown in FIG. 6.

The panel set data 6Bp indicates information on setting (my panel setting) relating to display on the touch panel display 10i, e.g., setting including a user-specific screen displayed on the touch panel display 10i immediately after a user logs in, language used in descriptions of messages and others on screens, and a font size in the screens.

The set processing contents data 6Bt indicates information on setting regarding a method for receiving data sent from other apparatus by IFAX (IFAX reception setting), setting regarding a method for transferring data received from a specific sender (specific sender data transfer setting) and setting regarding a method for transferring received FAX data (FAX data transfer setting).

A user applies his/her user set data 6B to an image forming apparatus 1 that is a home MFP for him/her, thereby to customize a use environment of the image forming apparatus 1. The image forming apparatus 1 performs processing based on the user set data 6B of the user who has logged in.

The "IFAX" is a communications service between an electronic mail client and a fax terminal through the Internet and a communications service in which an electronic mail sent by the former is received by the latter in the form of FAX data, or FAX data sent by the latter is received by the former in the form of electronic mail. The "IFAX" is sometimes called an "Internet FAX".

Referring back to FIG. 3, the box management portion 103 performs processing for securing in the hard disk drive 10d an area of a personal box PSB for each home user for that image forming apparatus 1 to manage each of the personal boxes PSB. The box management portion 103 performs processing, for example, for saving data newly in the personal box PSB, retrieving data from the personal box PSB based on user's request and updating/deleting data saved in the personal box PSB. Hereinafter, data stored (saved) in the personal box PSB is referred to as "document data 7".

As described later, a case may arise where a personal box PSB of a home user is managed by the box management portion 103 of other image forming apparatus 1. Accordingly, the box management portion 103 sometimes manages personal boxes PSB of users who are not home users for that image forming apparatus 1.

The new apparatus detection portion 121 performs processing for detecting other image forming apparatus 1 that has newly participated in (been newly added to) the intranet NW. For example, the new apparatus detection portion 121 sends a packet that is a predetermined signal to all nodes (apparatuses) in the intranet NW at regular intervals, e.g., every couple of minutes to every couple of hours. In short, the new apparatus detection portion 121 broadcasts packets. The new apparatus detection portion 121 checks a node that has responded to the predetermined signal and detects a node that has responded for the first time as an image forming apparatus 1 that has newly participated in the intranet NW. Hereinafter, the new image forming apparatus 1 thus detected is sometimes referred to as a "new image forming apparatus 1N".

The new apparatus function data obtaining portion 122 requests the new image forming apparatus 1N to send function data 8A indicating functions included in that new image forming apparatus 1N and apparatus identification data 8B, so that the new apparatus function data obtaining portion 122 obtains the same. For example, when an image forming apparatus 14 is detected as the new image forming apparatus 1N, the new apparatus function data obtaining portion 122 obtains from the image forming apparatus 14 function data 8A4 shown in FIG. 7 and apparatus identification data 8B4 shown in FIG. 8.

The apparatus function data storage portion 123 stores function data 8A concerning functions included in that image forming apparatus 1 itself and apparatus identification data 8B. For example, the image forming apparatus 11 stores function data 8A1 shown in FIG. 7 and apparatus identification data 8B1 shown in FIG. 8.

The following is a description of contents of the function data 8A and the apparatus identification data 8B. An "electronic mail server function" is a function for achieving a POP server and an SMTP server. Thereby, an electronic mail box is provided for each electronic mail account and an electronic mail sent from other device is saved in an electronic mail box of an electronic mail account corresponding to the destination of the electronic mail. An owner of the electronic mail account can browse an electronic mail saved in his/her electronic mail box by using an application of an electronic mail client. Further, the owner can send an electronic mail to be delivered to other user.

A home user of the image forming apparatus 1 having this function is given an electronic mail account and an electronic mail box for his/her own use. The home user can perform operation for transmission/reception of electronic mails remotely by using an application of an electronic mail client installed on the personal computer 2 or by using an application of an electronic mail client installed on the image forming apparatus 1 to operate the touch panel display 10i.

A "G3 FAX function" is a function for exchanging FAX data with other FAX terminal using a FAX protocol through a public telephone line. A "stapling function" is a function for stapling a printed material for completion. An "Optical Character Reader (OCR) function" is a function for scanning an original document, obtaining data of character images, analyzing the data and thereby creating text data of character strings depicted on the original document. Further, the OCR function can be used to analyze image data such as FAX data sent from other device to create text data of character strings indicated by character images depicted on the image data.

A "bulk data saving function" is a function for saving data in large quantities. Herein, it shows a capability for saving data, namely, a capacity of the hard disk drive 10d. A "PDF data creation function" is a function for creating PDF data. An "electronic mail encryption function" is a function for encrypting an electronic mail by using a technology such as Secure/Multipurpose Internet Mail Extensions (S/MIME). An "SIP-FAX function" is a function for performing FAX communications using a Session Initiation Protocol (SIP) and an SIP server. More specifically, the SIP-FAX function is a function that makes it possible to send image data on an IP network by communicating with an SIP server accumulating a correlation between a telephone number on a public telephone line and address information on the IP network to find an address on the IP network based on an entered destination telephone number.

Referring to FIG. 8, the apparatus identification data 8B indicates a name (a device name), an IP address, a MAC address, a Fax number and an installation location of the image forming apparatus 1.

The function data 8A and the apparatus identification data 8B are set when the image forming apparatus 1 is manufactured or set up.

Referring back to FIG. 3, the suitable function extraction portion 124 of the image forming apparatus 1 performs processing for extracting, from functions included in the new image forming apparatus 1N detected by the new apparatus detection portion 121, a suitable function, i.e., an advantageous function to a home user for the image forming apparatus 1 itself as compared to the present. A description is provided, with reference to the flowchart of FIG. 9, of a processing flow of the suitable function extraction portion 124 of the image forming apparatus 11 when the new apparatus detection portion 121 of the image forming apparatus 11 has detected the image forming apparatus 14 as the new image forming apparatus 1N.

The suitable function extraction portion 124 of the image forming apparatus 11 retrieves the function data 8A1 of that image forming apparatus 11 from the apparatus function data storage portion 123 (#101 in FIG. 9).

The function data 8A1 thus retrieved is compared with the function data 8A4 of the image forming apparatus 14 obtained by the new apparatus function data obtaining portion 122. Then, the suitable function extraction portion 124 extracts a function that is not included in the image forming apparatus 11 but included in the image forming apparatus 14 (#102). Further, the suitable function extraction portion 124 also extracts a function that is the same or similar function between the image forming apparatuses 11 and 14 and whose level (capability) is better in the image forming apparatus 14 than in the image forming apparatus 11 (#102). The comparative merits of functions in the image forming apparatuses 11 and 14 can be determined based on a numeric value showing the specifications, a version of software, usable processing or data or others.

For example, in the case where the function data 8A1 and 8A4 have the contents as shown in FIG. 7, the following functions are extracted. The electronic mail server function, the electronic mail encryption function and the SIP-FAX function are extracted because they are included in the image forming apparatus 14 and not included in the image forming apparatus 11. The stapling function is not extracted because it is included in both the image forming apparatuses 11 and 14 and has no difference in capability. The OCR function is extracted because the OCR function of the image forming apparatus 14 is superior to that of the image forming apparatus 11 though the OCR function is included in both the image forming apparatuses 11 and 14. The bulk data saving function and the PDF data creation function are extracted due to the same reason.

The suitable function extraction portion 124 further extracts, from the extracted functions, a function advantageous to each home user for that image forming apparatus 11 (#103-#107). More specifically, the following processing is performed with respect to each home user for the image forming apparatus 11. The suitable function extraction portion 124 retrieves user set data 6B of the first home user from the user set data storage portion 102 (#105). It is determined whether or not the functions extracted in Step #102 offer a benefit to the home user, e.g., improve convenience for the home user, based on the contents of the retrieved user set data 6B (#106).

For example, when the user set data 6B indicates "IFAX reception is received from an external mail server", it is determined that the electronic mail server function of the image forming apparatus 14, which is extracted in Step #102, is a function advantageous to the home user. Because the electronic mail server function, especially an SMTP server function, of the image forming apparatus 14 allows direct exchange of electronic mail data by IFAX without using an external mail server, i.e., the electronic mail server 5 and eliminates the loss of access/response to the external mail server. As a result, transmission/reception rate can be improved.

When the user set data 6B indicates "a document received from Mr. AAA is transferred to 06-xxxx-xxxx by G3FAX", it is determined that the SIP-FAX function of the image forming apparatus 14 offers a benefit. Because this function makes it possible to automatically find an address on the IP network from a telephone number of the transfer destination to transfer the received document by using the IP network. As a result, the received document can be transferred at a lower cost than a case where the G3FAX function of the image forming apparatus 11 is used.

When the user set data 6B indicates "a FAX-received document is converted into text data and is sent to xxxxx@mail . . . com by electronic mail", it is determined that the OCR function of the image forming apparatus 14 is an advantageous function. Because the OCR function of the image forming apparatus 14 can perform character recognition at higher precision than that of the image forming apparatus 11, so that the former can perform text conversion more precisely.

It is possible to define in advance what situation and for which function the set contents of the user set data 6B offer benefits. Then, the defined data may be registered in advance in each of the image forming apparatuses 1.

The suitable function extraction portion 124 of the image forming apparatus 11 determines and extracts a function that offers a benefit to the home user by the method described above. Then, the suitable function extraction portion 124 extracts a function that offers a benefit to the other home users from the functions of the image forming apparatus 14 extracted in Step #102.

Referring back to FIG. 3, the change candidate notice processing portion 125 performs processing for informing each home user of a beneficial function of the new image forming apparatus 1N that is extracted by the suitable function extraction portion 124 for each home user. For example, the change candidate notice processing portion 125 performs such processing by sending to an electronic mail address of each of the home users an electronic mail having contents that present a list of the beneficial function and recommendation of change of the home MFP. Note, however, that such processing is not performed for a home user for whom no beneficial functions are extracted.

The home user uses software of an electronic mail client of the personal computer 2 or the like to download and open the electronic mail. Then, as shown in FIG. 10, the electronic mail screen HG1 recommending functions advantageous to the home user is displayed on a display of the personal computer 2 in the form of a list.

Responding to this, the home user reads the contents and decides to change his/her home MFP to the new image forming apparatus 1N, to leave the home MPF as it is and to move only predetermined data to the new image forming apparatus 1N or to continue using the home MFP without changing the apparatus and moving the data. When stating that the home MFP is changed, the home user touches a button BT1a. When stating that only the predetermined data is moved to the new image forming apparatus 1N and the new image forming apparatus 1N is used to perform the beneficial functions hereafter, the home user touches a button BT1b. When no change and no movement are performed, the home user touches a button BT1c.

It is possible to adopt a design in which, even when beneficial functions are extracted without reflecting user's intention, the functions are automatically changed. In such a case, however, consideration is made only for advantages of functions regarding contents of user's setting. Accordingly, in some cases, such a design causes the following disadvantages for a user: 1. An MFP after the change is located at a position far from a position where the user is usually present. 2. The user is not familiar with operation of the MFP itself. 3. Print speed of the MFP is low. In such cases, the change of the home MFP disturbs the environment familiar to the user. In order to avoid the cases, in this embodiment, a configuration is provided in which a recommended function is displayed for the user by the home MFP to perform processing based on user's statement.

When the button BT1a is touched, the personal computer 2 sends to the current home MFP for the home user a command CM1 indicating that the home MFP should be changed to the new image forming apparatus 1N. When the button BT1b is touched, the personal computer 2 sends a command CM2 indicating that only predetermined data should be moved to the new image forming apparatus 1N. Note that the commands CM1 and CM2 are associated with a user ID of the home user.

The command receiving portion 126 receives a command issued from the personal computer 2. Then, depending on the contents of the command, the home change processing portion 127 and the data movement processing portion 128 perform processing.

When the command receiving portion 126 receives the command CM1, the home change processing portion 127 requests the new image forming apparatus 1N to accept the user identified by the user ID associated with the command CM1 as a new home user for that new image forming apparatus 1N.

When receiving a notice that the user can be accepted from the new image forming apparatus 1N, the home change processing portion 127 sends to the new image forming apparatus 1N address book data 6A and user set data 6B of the user that are stored in the address book storage portion 101 and the user set data storage portion 102, respectively. Further, the home change processing portion 127 sends to the new image forming apparatus 1N document data 7 saved in user's personal box PSB managed by the box management portion 103. When it can be confirmed that these data are received in the new image forming apparatus 1N, the home change processing portion 127 deletes the data of the user from the address book storage portion 101, the user set data storage portion 102 and the personal box PSB. The personal box PSB is also deleted.

When the command receiving portion 126 receives the command CM2, the data movement processing portion 128 requests the new image forming apparatus 1N to manage predetermined data of the user identified by the user ID associated with the command CM2. When receiving a notice that the predetermined data can be managed from the new image forming apparatus 1N, the data movement processing portion 128 sends the predetermined data of the user to the new image forming apparatus 1N. In this embodiment, the address book data 6A and the user set data 6B are not sent so that the home MFP of the user is maintained as it is. Instead, the data movement processing portion 128 sends data other than the address book data 6A and the user set data 6B, i.e., the document data 7 saved in the personal box PSB of the user. The document data 7 thus sent is deleted from the personal box PSB.

Further, the contents of the user set data 6B of the user are updated so as to apply the function of the new image forming apparatus 1N that is extracted by the suitable function extraction portion 124 for the user, from this time forward. This will be exemplified later.

Meanwhile, in the image forming apparatus 1 that has newly participated in the intranet NW, namely, the new image forming apparatus 1N, the home change request receiving portion 131 receives, from other image forming apparatus 1 that already participates in the intranet NW, a request for acceptance of a user who is a home user for the other image forming apparatus 1. The home change request receiving portion 131 checks free space and processing capability of the hard disk drive 10d of that new image forming apparatus 1N itself. Then, if the new image forming apparatus 1N can accept the user, the home change request receiving portion 131 notifies the other image forming apparatus 1 accordingly.

Then, address book data 6A and user set data 6B of the user are sent from the other image forming apparatus 1. The home change request receiving portion 131 lets the address book storage portion 101 and the user set data storage portion 102 of the new image forming apparatus 1N store the address book data 6A and the user set data 6B, respectively. In addition, document data 7 are sent from the other image forming apparatus 1. The home change request receiving portion 131 lets the box management portion 103 create a personal box PSB for that user newly to save the document data 7 in the created personal box PSB. In this way, the home MFP for that user is changed to the new image forming apparatus 1N.

With the change of the home MFP, the user set data 6B is updated. This will be exemplified later.

The data movement request receiving portion 132 receives a request for management of the document data 7 of the user from the other image forming apparatus 1 that already joins the intranet NW. The data movement request receiving portion 132 checks free space and processing capability and others of the hard disk drive 10d of that new image forming apparatus 1N itself. Then, if the document data 7 can be managed, the data movement request receiving portion 132 notifies the other image forming apparatus 1 accordingly in response to the request.

Responding to this, the document data 7 of the user is sent from the other image forming apparatus 1. As in the case of the processing by the home change request receiving portion 131, the data movement request receiving portion 132 lets the box management portion 103 create a personal box PSB for the user newly to save the document data 7 in the created personal box PSB.

Referring to FIGS. 11, 12, 13 and 14, there are described a case where a home MFP is changed, another case where a home MFP is changed, a case where data is moved, and another case where data is moved.

The following is a description of changes of the image forming apparatus 11 and the image forming apparatus 14, by way of example, when the image forming apparatus 14 newly joins the intranet NW where the image forming apparatus 11 already joins.

Figure 11:
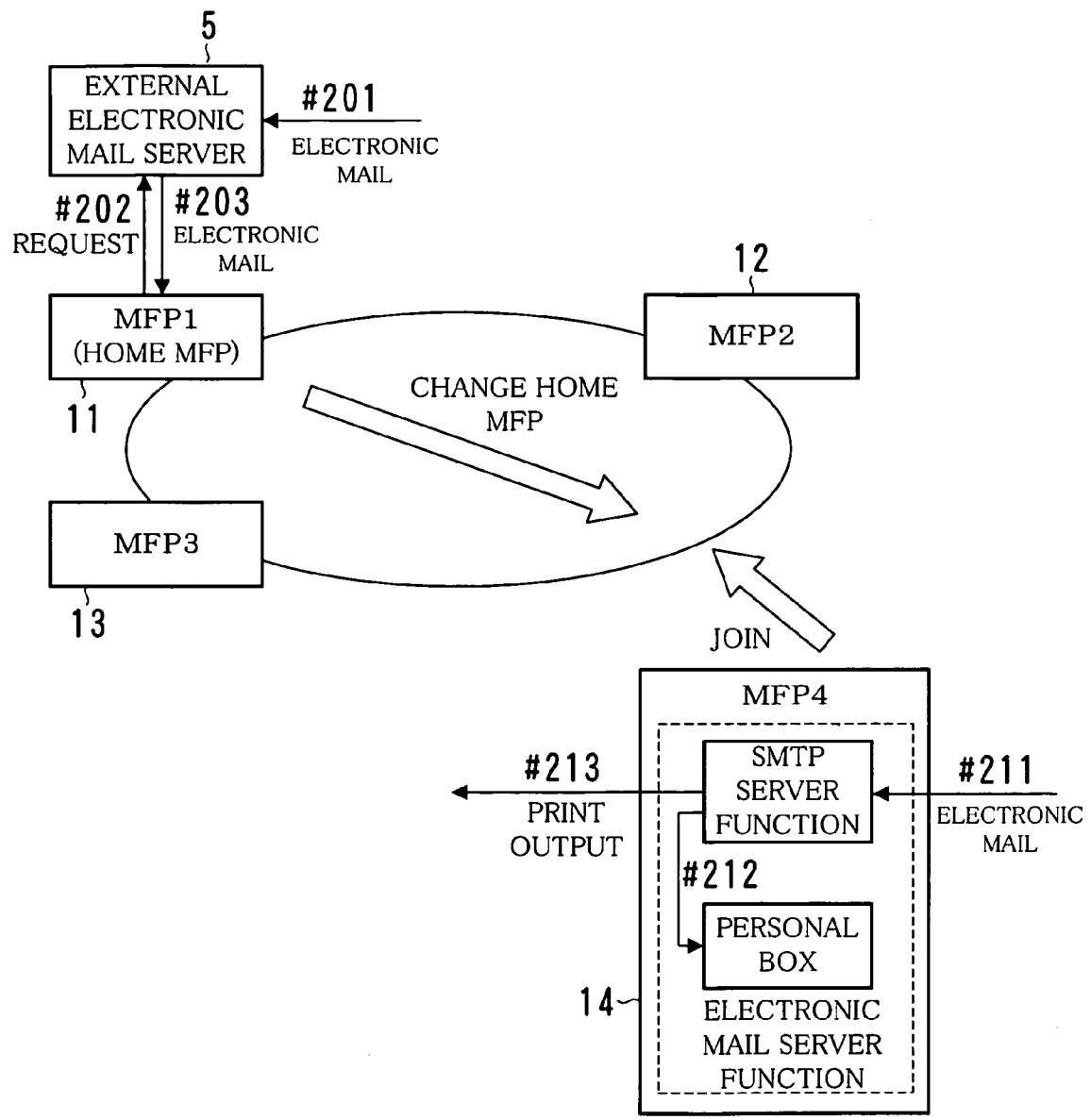
FIG. 11 is a schematic diagram of a case where a home MFP is changed.

Referring to FIG. 11, before the image forming apparatus 14 joins the intranet NW, the image forming apparatus 11 receives IFAX to be delivered to a certain user through the electronic mail server 5. More specifically, the electronic mail server 5 receives electronic mail data for IFAX (#201) instead of the image forming apparatus 11 and stores the electronic mail data in an electronic mail box of a user relating to the destination. The image forming apparatus 11 accesses the electronic mail server 5 to request the electronic mail stored in the electronic mail box (#202) then to download the same (#203). Then, the image forming apparatus 11 performs processing for storing the electronic mail in a personal box of the user relating to the destination or for printing out the same.

Suppose that the image forming apparatus 14 including the electronic mail server function, especially, an SMTP server function newly joins the intranet NW and the user has changed his/her home MFP from the image forming apparatus 11 to the image forming apparatus 14. Then, the image forming apparatus 14 comes to directly perform processing for receiving IFAX data for the user hereafter (#211-#213).

Note that when the home MFP is changed, address book data 6A, user set data 6B and document data 7 of the user are moved from the image forming apparatus 11 to the image forming apparatus 14. After the movement, set contents of the user set data 6B are updated according to need. In the example shown in FIG. 11, set contents of "IFAX reception setting" of the user set data 6B is updated from "IFAX reception is received from an external mail server" to "IFAX reception is received by a home MFP".

Figure 12:
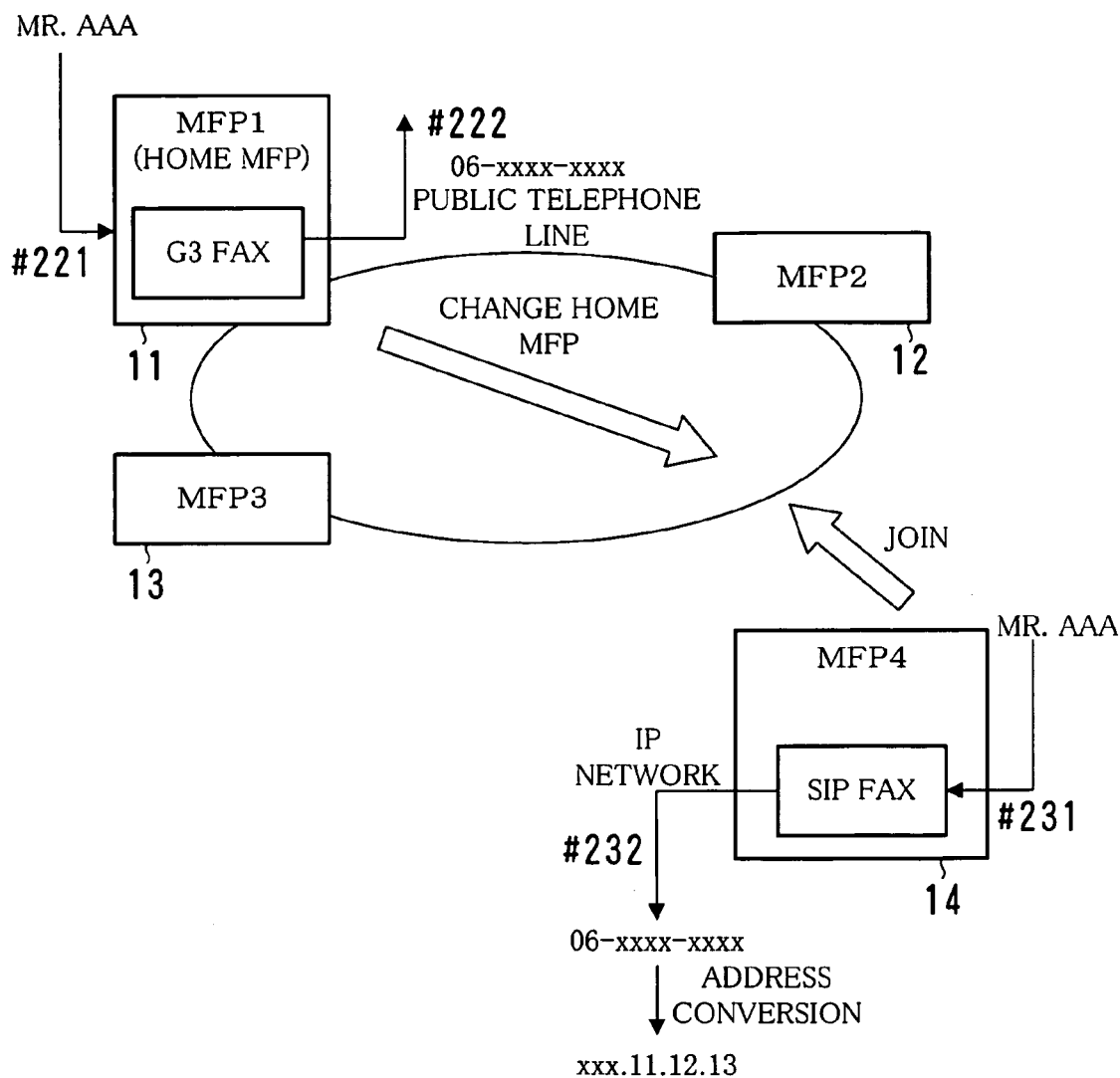
FIG. 12 is a schematic diagram of another case where a home MFP is changed.

Referring to FIG. 12, before the image forming apparatus 14 joins the intranet NW, the image forming apparatus 11 transfers data to be delivered from a specific sender to a certain user to a particular FAX terminal through a public telephone line (#221, #222). Suppose that the image forming apparatus 14 including the SIP-FAX function newly joins the intranet NW and the user has changed his/her home MFP from the image forming apparatus 11 to the image forming apparatus 14.

The image forming apparatus 14 updates set contents of "specific sender data transfer setting" of user set data 6B of the user from "transfer an incoming document from Mr. AAA to 06-xxxx-xxxx by G3FAX" to "transfer an incoming document from Mr. AAA to 06-xxxx-xxxx by SIP-FAX".

Then, due to the SIP communications, an IP network address is specified from the telephone number. The image forming apparatus 14 comes to transfer data delivered from the specific sender to the user through the IP network from this time forward (#231, #232).

Figure 13:
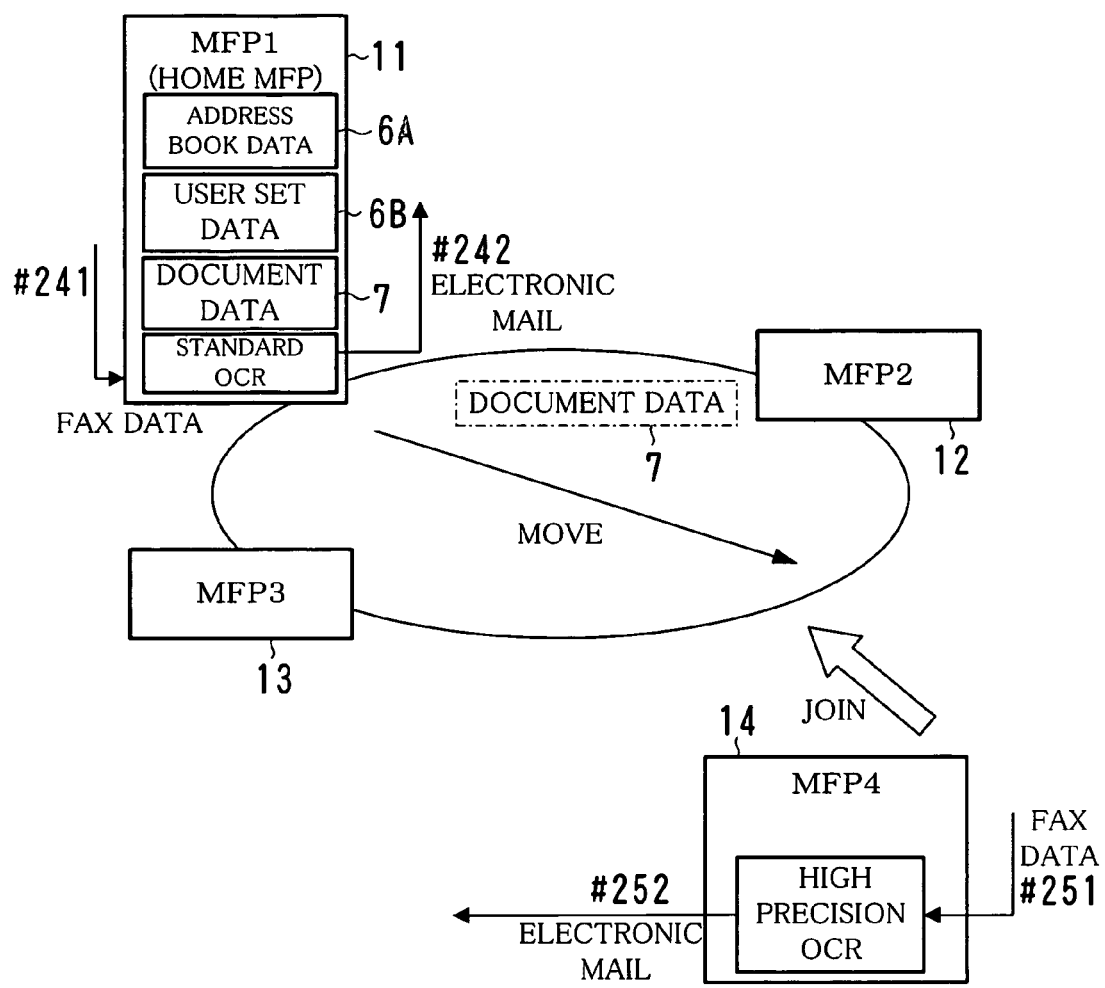
FIG. 13 is a schematic diagram of a case where data is moved.

Referring to FIG. 13, before the image forming apparatus 14 joins the intranet NW, when receiving FAX data to be delivered to a certain user (#241), the image forming apparatus 11 converts character images relating to the FAX data into text data using the OCR function, then to transfer the text data to a predetermined electronic mail address (#242).

Suppose that after the image forming apparatus 14 having an OCR function superior to that of the image forming apparatus 11 participates in the intranet NW newly, the user has moved his/her document data 7 from the image forming apparatus 11 to the image forming apparatus 14 without changing his/her home MFP, i.e., with leaving the image forming apparatus 11 as it is.

Then, the image forming apparatus 11 updates "FAX incoming document transfer setting" of user set data 6B (see FIG. 6) of the user from "FAX incoming document is converted into text data to send to xxxxx@mail . . . com by electronic mail" to "FAX incoming document is converted into text data by the image forming apparatus 14 to send to xxxxx@mail . . . com by electronic mail". After that, instead of the image forming apparatus 11, the image forming apparatus 14 comes to perform processing for converting FAX data to be delivered to the user into text data to send the text data to a predetermined address. According to the example illustrated in FIG. 13, when receiving FAX data to be delivered to a certain user (#251), the image forming apparatus 14 converts character images relating to the FAX data into text data using the high precision OCR function, then transfers the text data to a predetermined electronic mail address (#252). In addition, the image forming apparatus 14 prepares a personal box PSB for the user to manage document data 7 of the user instead of the image forming apparatus 11.

Figure 14:
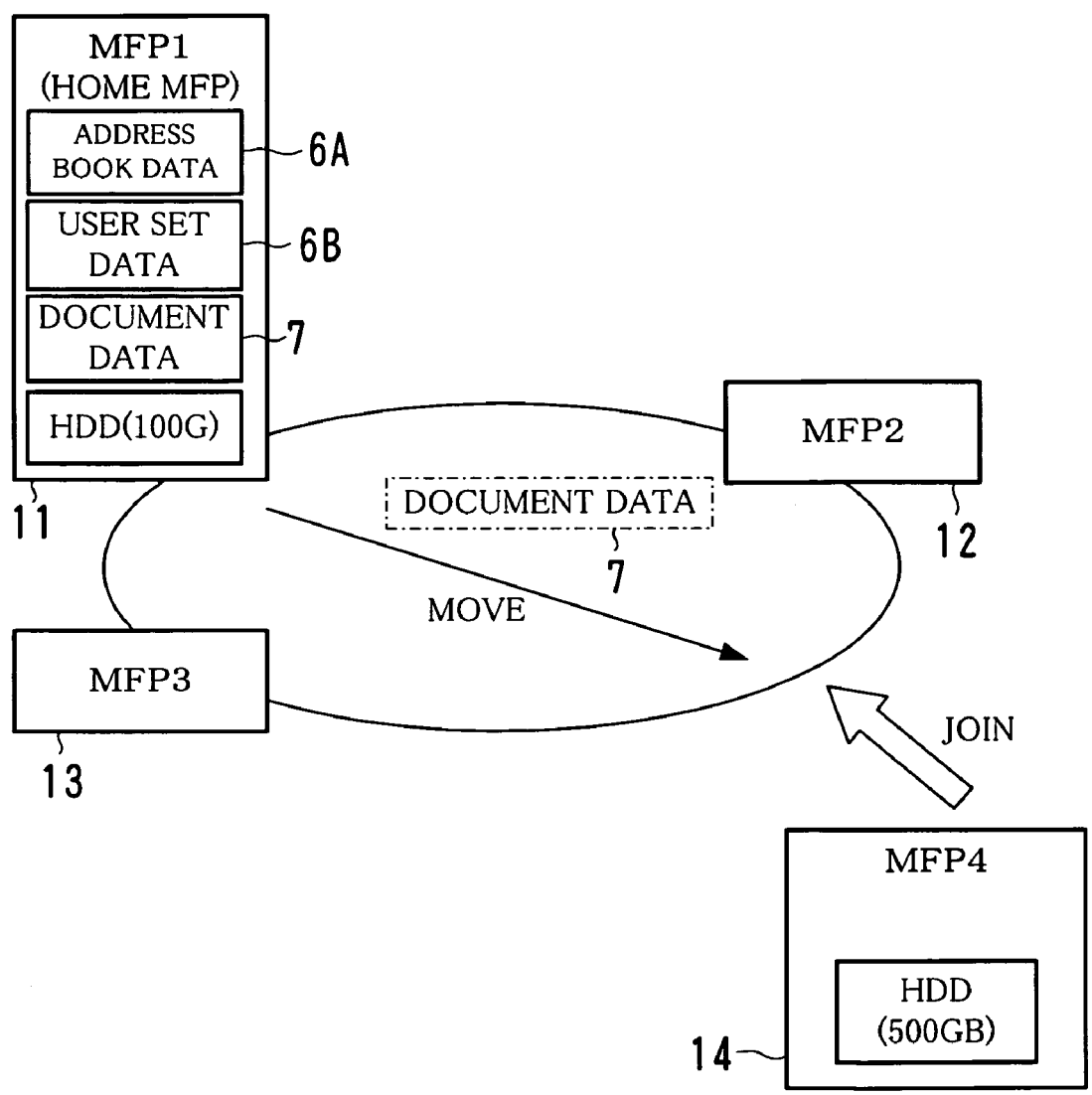
FIG. 14 is a schematic diagram of another case where data is moved.

Referring to FIG. 14, before the image forming apparatus 14 joins the intranet NW, the image forming apparatus 11 manages a personal box PSB and document data 7 of a certain home user.

Suppose that after the image forming apparatus 14 having the hard disk drive 10d whose capacity is larger than the hard disk drive 10d of the image forming apparatus 11 newly joins the intranet NW, a certain user has moved his/her document data 7 from the image forming apparatus 11 to the image forming apparatus 14 without changing his/her home MFP, i.e., with leaving the image forming apparatus 11 as it is. Then, the image forming apparatus 14 prepares a personal box PSB for the user and manages the document data 7 of the user instead of the image forming apparatus 11. Thereby, the user can save data in the personal box PSB without worrying about the free space of the hard disk drive 10d as in conventional cases.

Next, a description is provided, with reference to the flowchart of FIG. 15, of a processing flow of the image forming apparatus 1 that already participates in the intranet NW.

When detecting a new image forming apparatus 1N (Yes in #1), the image forming apparatus 1 already joining the intranet NW performs processing for extracting a function advantageous to each home user from functions included in the new image forming apparatus 1N (#2). Such processing procedure is as described earlier with reference to FIG. 9.

Each home user refers to the electronic mail screen HG1 and decides to change his/her home MFP to the new image forming apparatus 1N, to leave the home MPF as it is and to move only predetermined data to the new image forming apparatus 1N and to use the new image forming apparatus 1N to perform the advantageous function, or to continue using the home MFP without changing the apparatus and moving the data. Then, each home user touches a button corresponding to the decision to give a command to the image forming apparatus 1.

When receiving the command (Yes in #3), the image forming apparatus 1 performs processing in accordance with contents of the command. More specifically, when receiving a command CM1, namely, a command indicating that the home MFP should be changed to the new image forming apparatus 1N (Yes in #4), the image forming apparatus 1 sends, for example, address book data 6A, user set data 6B and document data 7 of the user to the new image forming apparatus 1N to move the same thereto in order to change the home MFP for the user who has given the command to the new image forming apparatus 1N (#6).

Note that, before the movement, contents of the user set data 6B are updated with the change of the home MFP (#5). Alternatively, the new image forming apparatus 1N may update the user set data 6B.

By the processing described above, for the user who has given the command, roles of the image forming apparatus 1 and the new image forming apparatus 1N are changed as illustrated earlier with reference to FIGS. 11 and 12.

When receiving a command CM2, namely, a command indicating that only predetermined data should be moved to the new image forming apparatus 1N and the advantageous function should be performed in the new image forming apparatus 1N (No in #4, Yes in #7), the image forming apparatus 1 sends data other than data to be managed by the home MFP to the new image forming apparatus 1N to move the same thereto (#8). More specifically, address book data 6A and user set data 6B of the user are not moved and document data 7 of the user are moved. Then, the image forming apparatus 1 updates the contents of the user set data 6B so that the functions advantageous to the user are performed by the new image forming apparatus 1N (#9).

By the processing described above, for the user who has given the command, roles of the image forming apparatus 1 and the new image forming apparatus 1N are changed as illustrated earlier with reference to FIGS. 13 and 14. A configuration may be adopted in which when the new image forming apparatus 1N is present at a location away from a place where a user is usually present, the home MFP is left as it is, the document data 7 is moved and the new image forming apparatus 1N is caused to perform beneficial functions.

According to this embodiment, when a new image forming apparatus 1N joins a network, functions of the new image forming apparatus 1N can be introduced in a manner advantageous to users. Further, a home MFP can be changed or data can be moved depending on the user's request.

Besides, as described above, since the home MFP can be changed only through one-button control on the electronic mail screen HG1, operability is good and simple.

A configuration is possible in which when a plurality of the image forming apparatuses 1 is added to the intranet NW at the same time, a function fluently used is determined based on a history of jobs that were executed by a user and a home MFP is changed to the image forming apparatus 1 having the function.

Further, the move destination of user's data may be distributed for each image forming apparatus 1 having a function by which each piece of the data is used.

In the present embodiment, each of the image forming apparatuses 1 that already join the intranet NW determines whether or not a function of a new image forming apparatus 1N is advantageous to home users. However, a configuration may be adopted in which the intranet NW is provided with a server for the determination and the server makes the determination centrally.

A function beneficial for a user may be determined based on a history of jobs that were executed by the user in the past. For example, when the PDF data creation function is included in a new image forming apparatus 1N, it may be determined that the PDF data creation function is advantageous to a user who has performed SCAN-TO-PC predetermined number of times or more. The SCAN-TO-PC is processing for converting an image read by scanning a print side of paper into image data to send the image data to a terminal such as a personal computer 2 specified by the user.

In the present embodiment, a function beneficial for a user is presented by means of electronic mail. Instead, however, such a function may be presented when a user operates the touch panel display 10i to directly log in to the image forming apparatus 1.

In the embodiments described above, the overall configuration of the intranet NW and the image forming apparatus 1, the configurations of various portions thereof, the details of processing, the processing order, and the like may be changed as needed, in accordance with the subject matter of the present invention.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. An image processing apparatus having a portion for joining a network, the apparatus comprising:
a processing contents data storage portion for storing processing contents data for a user whose designated home image processing apparatus is the image processing apparatus, the processing contents data indicating contents processing methods that a user sets the designated home image processing apparatus to perform, wherein the home image processing apparatus is used primarily by the user;
a newly-joined apparatus detection portion for detecting another image processing apparatus that has newly joined the network;
a function data obtaining processing portion for obtaining function data indicating functions that the newly-joined image processing apparatus has;
an appropriate function determination portion for determining a function that is more appropriate for the user for carrying out at least one of the contents processing methods specified in the processing contents data by using the newly-joined image processing apparatus rather than using a current function using the image processing apparatus; and
an appropriate function offering portion for presenting, to the user, the function that is determined to be more appropriate by the appropriate function determination portion;
wherein the appropriate function offering portion performs the processing for the presentation by displaying a screen for the user to select whether or not the newly-joined image processing apparatus is designated as the home image processing apparatus hereafter.

2. The image processing apparatus according to claim 1, further comprising a home apparatus change processing portion for performing home apparatus change processing by moving data of the user to the newly-joined image processing apparatus when the user designates the newly-joined image processing apparatus as the home image processing apparatus hereafter.

3. The image processing apparatus according to claim 2, wherein when performing the home apparatus change processing, the home apparatus change processing portion moves at least one of the processing contents data and address book data of the user as the data of the user.

4. The image processing apparatus according to claim 1, further comprising
a document data saving portion for saving document data of the user, and
a data movement processing portion for moving the document data, saved in the document data saving portion, of the user to the newly-joined image processing apparatus when the user selects the newly-joined image processing apparatus to perform processing relating to the function determined to be more appropriate for the user by the appropriate function determination portion.

5. The image processing apparatus according to claim 1, wherein when the newly-joined image processing apparatus has an electronic mail server function while the image processing apparatus does not have an electronic mail server function, and when the processing contents data of the user indicates that the image processing apparatus receives IFAX data sent from a transmission source from an external server having the electronic mail server function, the appropriate function determination portion determines that the electronic mail server function using the newly-joined image processing apparatus is more appropriate for the user than a current function using the image processing apparatus.

6. The image processing apparatus according to claim 1, wherein when the newly-joined image processing apparatus has an SIP-FAX function while the image processing apparatus does not have an SIP-FAX function, and when the processing contents data of the user indicates that the image processing apparatus transfers data received from a predetermined transmission source to a predetermined transfer destination, the appropriate function determination portion determines that the SIP-FAX function using the newly-joined image processing apparatus is more appropriate for the user than a current function using the image processing apparatus.

7. The image processing apparatus according to claim 1, wherein when the newly-joined image processing apparatus has a character recognition function with higher precision than that in the image processing apparatus, and when the processing contents data of the user indicates that the image processing apparatus converts received FAX data into text data to transfer the text data to a predetermined transfer destination, the appropriate function determination portion determines that the character recognition function of the newly-joined image processing apparatus is more appropriate for the user than the character recognition function of the image processing apparatus.

8. A method for offering functions, the method comprising:
  storing processing contents data in a processing contents data storage portion of an image processing apparatus designated as a home image processing apparatus for a user, the processing contents data indicating contents processing methods that the user sets the designated home image processing apparatus to perform, the image processing apparatus having already joined a network, wherein the home image processing apparatus is used primarily by the user;
  detecting another image processing apparatus that has newly joined the network;
  obtaining function data indicating functions that the newly-joined image processing apparatus has;
  determining a function that is more appropriate for the user for carrying out at least one of the contents processing methods specified in the processing contents data by using the newly-joined image processing apparatus rather than using a current function of the image processing apparatus; and
  presenting, to the user, the function that is determined to be more appropriate than the current function;
  wherein when the processing for the presentation is performed, a screen is displayed for the user to select whether or not the newly-joined image processing apparatus is designated as the home image processing apparatus for the user hereafter.

9. The method according to claim 8, further comprising performing home apparatus change processing by moving data of the user to the newly-joined image processing apparatus when the newly-joined image processing apparatus is designated as the home image processing apparatus for the user hereafter.

10. The method according to claim 9, when the home apparatus change processing is performed, at least one of the processing contents data and address book data of the user is moved as the data of the user.

11. The method according to claim 8, further comprising
  saving document data of the user in a document data saving portion in the image processing apparatus, and
  moving the document data, saved in the document data saving portion, of the user to the newly-joined image processing apparatus when the user sets the newly-joined image processing apparatus to perform processing relating to the function determined to be more appropriate for the user than the current function of the image processing apparatus.

12. A non-transitory computer storage medium storing a computer program product for use in an image processing apparatus having a portion for joining a network, the computer program product causing the image processing apparatus to perform:
  detecting another image processing apparatus that has joined the network;
  obtaining function data indicating functions that the newly-joined image processing apparatus has;
  obtaining processing contents data indicating contents processing methods that a user sets the image processing apparatus to perform, the image processing apparatus being designated as a home image processing apparatus for the user, wherein the home image processing apparatus is used primarily by the user;
  determining, based on the processing contents data, a function that is more appropriate for the user for carrying out at least one of the contents processing methods specified in the processing contents data by using the newly-joined image processing apparatus rather than using a current function from the image processing apparatus; and
  presenting, to the user, the function that is determined to be more appropriate than the current function in the determination step;
  wherein when the processing for the presentation is performed, the image processing apparatus is made to perform processing for displaying a screen for the user to select whether or not the newly-joined image processing apparatus is designated as the home image processing apparatus for the user hereafter.

13. The non-transitory computer storage medium according to claim 12, wherein the computer program product further causes the image processing apparatus to perform home apparatus change processing by moving data of the user to the newly-joined image processing apparatus when the newly-joined image processing apparatus is designated as the home image processing apparatus for the user hereafter.

14. The non-transitory computer storage medium according to claim 13, wherein, as the home apparatus change processing, the image processing apparatus is made to perform processing for moving at least one of the processing contents data and address book data of the user as the data of the user.

15. The non-transitory computer storage medium according to claim 12, wherein the computer program product further causes the image processing apparatus to perform moving the document data, saved in a document data saving portion of the image processing apparatus, of the user to the newly-joined image processing apparatus when the user sets the newly-joined image processing apparatus to perform processing relating to the function determined to be more appropriate for the user than the current function of the image processing apparatus.

* * * * *